Nov. 1, 1927.  
L. L. WHITNEY  
1,647,597  
METHOD OF FORMING CHECK NUTS  
Filed July 24, 1924
Fig. 1
Fig. 2
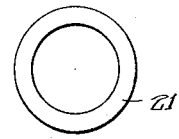
Fig. 3
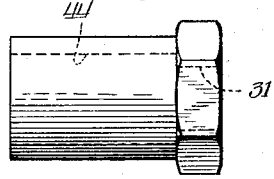
Fig. 4
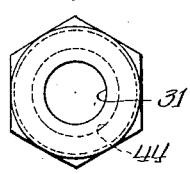
Fig. 5
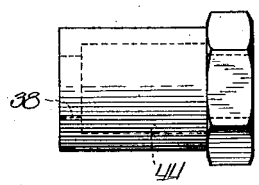
Fig. 6
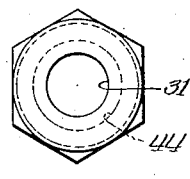
Fig. 7
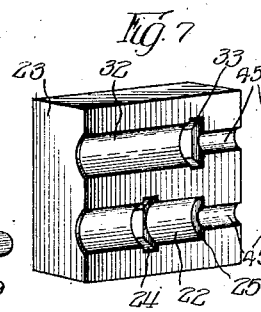
Fig. 8
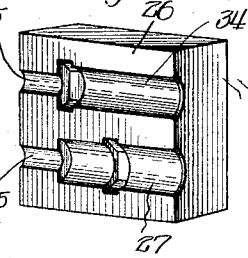
Fig. 9
Fig. 10
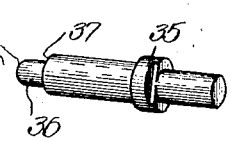
Fig. 11
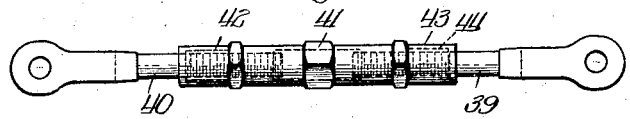
Witness:  
R. Burkhardt.
Inventor:  
Loren L. Whitney,  
By Wilkinson, Huxley, Byron & Knight  
attys Patented Nov. 1, 1927.

1,647,597

UNITED STATES PATENT OFFICE.

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY.

METHOD OF FORMING CHECK NUTS.

Application filed July 24, 1924. Serial No. 727,915.

This invention relates to a new and improved method of forming check-nuts for turn-buckles and more particularly to a method of forming such nuts by series of forging operations.

Nuts of this type are preferably tubular in form, being provided upon one end with an outer hexagonal portion and with a threaded inner portion and upon the other end with an inturned flange adapted to closely engage the rod shank. The intermediate portion of the check-nut or lock-nut is adapted to enclose and protect the threaded portion of the shank upon which it is applied and to contain a packing of lubricant to prevent rusting of the thread.

It is an object of the present invention to provide a new and improved method for forming such nuts from a tubular blank by a series of forging operations.

It is a further object to provide a method of this character which is adapted for rapid commercial production.

Other and further objects will appear as the description proceeds.

I have shown in the accompanying drawings the nuts in various stages of manufacture and the dies used in such manufacture.

In the drawings—

Figure 1 is a side view of the blank operated upon;

Figure 2 is an end view of Figure 1;

Figure 3 is a view similar to Figure 1, but showing the blank after the first pass;

Figure 4 is an end view of Figure 3;

Figure 5 is a view similar to Figure 1 but showing the completed nut;

Figure 6 is an end view of Figure 5;

Figures 7 and 8 show the dies used in forming the ends;

Figure 9 is a view of the first pass plunger;

Figure 10 is a view of the second pass plunger; and

Figure 11 is a view of the nuts as applied to a brake cylinder lever rod.

The nut is formed from a tubular blank as shown in Figures 1 and 2. One end of the blank is first heated by local application of heat and the blank is then placed in the lower recess 22 in the die 23. This recess 22 is provided with a hexagonal portion 24 and the blank is placed in the recess in such manner that the heated end comes opposite the hexagonal portion of the recess. The cold end of the blank bears against the end 25 of the recess. The other die 26 is now brought against the die 23, this die being formed with a recess 27 corresponding to the recess 22.

The plunger 28 is next forced axially into the blank. The reduced portion 29 of the plunger enters the bore of the blank and the shoulder 30 engages its heated end. The portion 29 is of less diameter than the bore and is of the diameter of the portion 31 of the nut, as shown in Figures 3 and 5. The heated metal is forced both outwardly into the hexagonal recess of the die and inwardly against the reduced portion 29 of the plunger by means of the pressure applied by shoulder 30. The blank during the first pass assumes the form shown in Figures 3 and 4 having the hexagonal gripping portion and the inturned securing portion 31, and is next removed from the dies and permitted to cool.

The opposite end is then heated by local application of heat and the blank is next placed in the upper recess 32 of the die 23. The hexagonal portion of the partly formed blank fits into the hexagonal portion 33 of the recess 32. The die 26 is brought against the die 23, this die being provided with the recess 34 corresponding to the recess 32.

The plunger 35 shown in Figure 10 is then forced axially against the heated end of the blank. The reduced end 36 of the plunger enters the bore of the blank and the shoulder 37 bears against the heated end. This end of the blank is restrained against outer deformation by the die recesses 32 and 34 and is deformed inwardly against the reduced portion 36 of the plunger to form the inturned enclosing shoulder 38, as shown in Figure 5. To complete the nut for use, the inwardly extending portion 31 is suitably threaded.

It will be understood that it is necessary to handle the blanks and partly completed nuts by means of mandrels or holders and when the dies are closed together the mandrel will extend outwardly from the dies through the recesses 45 as shown in Figures 7 and 8.

The nut has been shown in Figure 11 as applied to a brake cylinder lever rod. The rod consists of two jaw pieces 39 and 40 connected by turn-buckle 41. Two nuts 42 and 43 are used, the hexagonal ended threaded portions being brought against the end of the turn-buckle 41 to lock it in place. Intermediate portions 44 of the nuts are spaced from the threads and they contain a packing of lubricant to prevent the rusting of the threads. The inturned portion 38 of the nuts closely engage the shanks of the jaw pieces of the rod.

I claim:

1. The method of forming check-nuts or the like from a tubular blank which comprises heating the blank, forcing the metal at one end of the blank simultaneously outwardly to form a gripping portion and inwardly to form a securing portion, while securing the remaining portion of the blank against deformation and threading said securing portion.

2. The method of forming check-nuts or the like from a tubular blank which comprises heating one end of the blank, forcing the metal at the heated end simultaneously outwardly to form a gripping portion and inwardly to form a securing portion while securing the remaining portion of the blank against deformation and threading said securing portion.

3. The method of forming check-nuts or the like from a tubular blank which comprises heating one end of the blank, forcing the metal at the heated end outwardly to form a gripping portion and inwardly to form a securing portion, allowing the blank to cool, heating the opposite end of the blank, forcing the metal at the heated end inwardly to form an inturned enclosing shoulder, and threading the securing portion.

4. The method of forming check-nuts or the like from a tubular blank which comprises heating the blank, supporting the main portion of the blank against outward deformation, leaving an end portion unsupported but enclosed by forming dies, applying endwise pressure to the blank and passing a member into the die to limit inward deformation whereby the metal is forced outwardly into the forming dies to form a gripping portion and inwardly against the limiting member to form a securing portion, and threading the securing portion.

5. The method of forming check-nuts or the like from a tubular blank which comprises heating one end of the blank, supporting the main portion of the blank against outward deformation, leaving the heated end portion unsupported but enclosed by forming dies, applying endwise pressure to the blank and passing a member into the die to limit inward deformation whereby the metal is forced outwardly into the forming dies to form a gripping portion and inwardly against the limiting member to form a securing portion, and threading the securing portion.

6. The method of forming check-nuts or the like from a tubular blank which comprises heating one end of the blank, supporting the main portion of the blank against outward deformation, leaving the heated end portion unsupported but enclosed by forming dies, applying endwise pressure to the blank and passing a member into the die to limit inward deformation whereby the metal is forced outwardly into the forming dies to form a gripping portion and inwardly against the limiting member to form a securing portion, allowing the blank to cool, heating the opposite end of the blank, supporting the heated end of the blank against outward deformation, placing a deformation limiting member within the blank and applying endwise pressure to the heated end whereby the metal is deformed inwardly to form an inturned enclosing shoulder, and threading the securing portion.

7. The method of forming check-nuts or the like from a tubular blank which comprises heating the blank and forcing the metal at one portion of the blank both outwardly and inwardly simultaneously to form a gripping portion and a securing portion, while securing the remaining portion of the blank against deformation.

Signed at Hammond, Indiana, this 18th day of July, 1924.

LOREN L. WHITNEY.